Apr. 10, 1923
H. H. BOYCE
1,451,527
TEMPERATURE INDICATING INSTRUMENT FOR MOTOR VEHICLE RADIATORS
Original Filed June 20, 1914
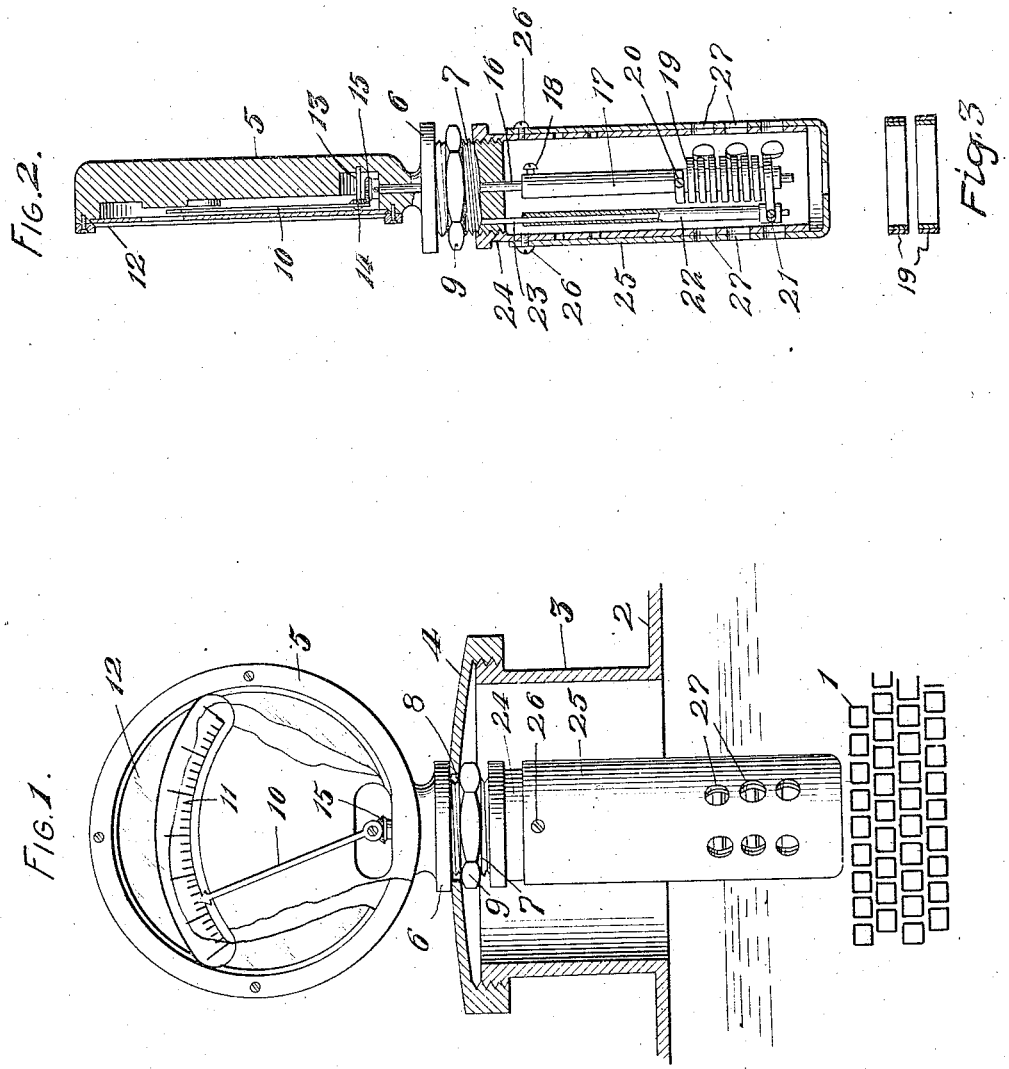
INVENTOR
Harrison H. Boyce
BY
Edmund Quincy Moses
His ATTORNEY Patented Apr. 10, 1923.

1,451,527

UNITED STATES PATENT OFFICE.

HARRISON H. BOYCE, OF FOREST HILLS, NEW YORK.

TEMPERATURE-INDICATING INSTRUMENT FOR MOTOR-VEHICLE RADIATORS.

Original application filed June 20, 1914, Serial No. 846,247. Divided and this application filed February 20, 1919. Serial No. 278,224.

*To all whom it may concern:*

Be it known that I, HARRISON H. BOYCE, a citizen of the United States, residing in Forest Hills, County of Queens, and State of New York, have invented certain new and useful Improvements in Temperature-Indicating Instruments for Motor-Vehicle Radiators, of which the following is a specification.

This invention relates to means for indicating the thermal condition of internal combustion vehicle propelling engines, such as are used on automobiles or other vehicles. Such engines are commonly provided with water circulation cooling systems including radiators into which the heated water from the engine cylinder jackets is discharged at the upper part of the radiator, passes down through the radiator, giving up its heat meanwhile to the air passing through the radiator tubes, and when finally cooled is returned from the lower part of the radiator to the engine jackets.

In my Patent No. 1,090,776 I have indicated the desirability for an instrument for indicating the operating condition of such an engine and have pointed out some of the results obtainable and advantages incident to the use of an instrument for this purpose. I have also disclosed in said patent a means for indicating the thermal condition of the engine characterized by the use of instrumentalities having a temperature responsive element so located and organized in connection with the engine cooling system as to be influenced by temperatures existing in a space above the normal level of the water in the cooling system, said space being preferably in the upper part of the radiator or in the radiator filler spout, above the water level.

In most cases, especially in automobile practice, this mode of securing an indication of engine conditions is highly satisfactory and to be preferred to any other, but in certain instances it is desirable to provide an instrument adapted to show the actual water temperature in the radiator and accordingly having a temperature responsive element normally submerged in the water and responding directly to water temperatures. Such an instrument will find particular utility in making certain kinds of tests.

It is furthermore desirable that such an instrument shall be of general application and capable of use upon radiators of various types and designs so as to avoid the necessity of a special construction of instrument for each make or design of radiator.

It is also desirable to have the temperature responsive element located at the lowest practicable point in the upper part of the radiator, preferably directly above the bank of tubes therein, so as to permit the greatest possible variation in the water level within the radiator to occur without exposing the temperature responsive element and so rendering the instrument inaccurate as an indicator of actual water temperatures. It is well known that radiators vary greatly in dimensions and particularly in the dimensions of the top tank or space in the radiator above the bank of tubes and it is also well known that the water level in the radiator is not constant but varies considerably under the conditions of use and is often permitted to fall considerably below the top of the radiator. These conditions must be provided for in an instrument designed for general application to radiators and intended to indicate at all times so far as possible the actual temperature of the water within the radiator.

It is the object of the present invention to meet these conditions by the provision of an instrument having a temperature responsive element adjustably connected to the indicating part of the instrument so that it may be extended more or less below the point of support to bring it into the desired position and to adapt the instrument to use upon radiators of different dimensions. By making the temperature responsive element adjustable it may be extended to the lowest practicable level in the radiator when water temperatures are sought, thereby permitting the maximum variation in the water level without affecting the correct reading of the instrument, or if the normal water level in the radiator is not too high and it is desired to cause the instrument to respond to the temperature of the space over the water in accordance with te invention of Patent No. 1,090,776, then the instrument may be shortened to bring the temperature responsive element to a point above the normal water level.

In the accompanying drawings in which I have shown one preferred embodiment of the invention as illustrative of the principle thereof and the best mode now known to me for practicing the same.

Figure 1 is a face view of one form of the instrument showing the same mounted upon the filler cap of a radiator and illustrating the upper part of the radiator and filler spout in vertical section;

Figure 2 is a vertical transverse section of the instrument; and Figure 3 is a cross-sectional elevation of two turns of the bi-metallic coil which forms the temperature responsive element.

Referring to the drawings in detail, these show the form of the invention selected for illustration as applied to a conventional type of radiator, such as is used upon automobiles. A fragment of the upper part of the radiator only is shown, the radiator having the usual bank of tubes 1 surmounted by a casing section 2, commonly referred to as the top tank, which comprises a space for the reception of the heated water from the engine and distributes the same over the bank of tubes in a well understood manner. The radiator has the usual filler spout 3 adapted to be closed by the removable cap 4. In the ordinary use of such a radiator the water level will normally stand somewhere in the top tank above the top of the bank of tubes, the exact point being variable.

The temperature indicating means in the embodiment shown comprises a casing 5 having a base 6 adapted to seat upon the radiator cap, the base having a screw threaded stem 7 projecting through a hole 8 in the cap. Means are provided for attaching the instrument to the cap, a nut 9 being illustrated for this purpose. The indicating means comprise suitable indicating devices located within the casing and arranged to be actuated by a temperature responsive element extending into the casing and adjustably mounted so that it may be set at the desired level.

In the particular construction illustrated the indicating devices comprises an index hand 10 adapted to move over a scale 11, the scale and hand being mounted within a recess in the casing closed at the front by a crystal 12 permitting the hand and scale to be observed from the driver's seat of the vehicle. The hand is mounted at the lower end upon a pivot 13 and has a beveled gear 14 which meshes with a beveled gear 15 on a shaft 16 which extends downwardly through a hole in the instrument base. Mounted on this shaft is a sleeve 17 adapted to be secured in an adjustable position thereon in any suitable manner, as by a set screw 18. In the particular instrument disclosed the temperature responsive element comprises a bi-metallic coil 19, although it is to be understood that any other suitable form of temperature responsive means may be employed. The coil 19 is secured at its upper end to the sleeve 17 as indicated at 20, and has its other end secured at 21 to a sleeve 22 slidingly mounted on a post 23 supported at its upper end in the instrument base. It will be seen that by loosening the set screw 18 the sleeves 17 and 22 and the bi-metallic element carried thereby may be moved up or down to the desired level and secured in position by tightening the set screw. Preferably these elements are enclosed within a protective housing comprising a sleeve 24 screwing on the stem 7 or otherwise suitably mounted, and on which telescopes the thimble 25. The thimble may be secured in any desired adjusted position on the sleeve by suitable means such as the screws 26 which pass freely thru holes in the thimble 25 and into threaded holes located at different heights in the sleeve 24. In order to give free access of the heated water to the temperature responsive element, the members 24 and 25 are preferably provided with perforations 27 which are adapted to register when the thimble is fully telescoped on the sleeve, access to the temperature responsive element being of course provided by the perforations in the thimble when the latter is moved to a lower position upon the sleeve. In the operation of the instrument, the heated medium acting upon the bi-metallic coil causes the latter to unwind more or less in a well understood manner, thereby rotating the sleeve 17 and shaft 16 through the beveled gearing operating the index hand so as to show the temperature. If a larger range of adjustment is desired than that provided by merely telescoping the sleeves, this may be accomplished by substituting longer or shorter parts when necessary.

This application is a division of my application for Patent Serial No. 846,247, filed June 20, 1914, Patent No. 1,311,152, dated July 29, 1919.

While I have illustrated and described in detail one preferred embodiment of my invention, it will be understood that changes may be made therein without departing from the scope thereof as indicated by the appended claims so long as the principle of my invention is employed in the structure utilized.

Having thus described my invention, I claim:—

1. In means for indicating the thermal condition of an internal combustion engine having a water circulation cooling system including a radiator, the combination with the radiator of an instrument adapted to be mounted thereon and having temperature indicating means outside of the radiator and a temperature responsive element within the radiator operatively connected to said indicating means and adjustable means for supporting said temperature responsive element.

2. In means for indicating the thermal condition of an internal combustion engine having a water circulation cooling system including a radiator, the combination with the radiator of a temperature indicating instrument including a temperature responsive element located within the radiator and means adapted to adjustably support said element at different levels within the radiator.

3. In means for indicating the thermal condition of an internal combustion engine having a water circulation cooling system including a radiator having a filler spout and cap therefor, the combination with the radiator, filler spout and cap of a temperature indicating instrument mounted on the cap and having a temperature responsive element extending below the cap into the radiator, and means for adjustably supporting said temperature responsive element at different levels.

4. In means for indicating the thermal condition of an internal combustion engine having a water circulation cooling system including a radiator having a filler spout and cap therefor, the combination with the radiator, filler spout and cap of a temperature indicating instrument mounted on the cap, a temperature responsive element adapted to be inserted thru the filler spout, and a telescopic connection between said indicating instrument and said temperature responsive element whereby the latter may be operatively supported at different levels below said indicating instrument.

5. In an instrument of the character described the combination of indicating devices, a base, a temperature responsive element adjustably mounted below said base, and operatively connected to said indicating devices and a protective housing for said element comprising telescopically adjustable members.

6. In an instrument of the character described the combination of indicating devices, a base, a temperature responsive element adjustably mounted below said base, and operatively connected to said indicating devices and a protective housing for said element comprising a sleeve and a perforated thimble adjustably mounted thereon.

7. In an instrument of the character described the combination of a casing, indicating devices therein, an operating shaft for said indicating devices extending from the casing, a sleeve adjustably mounted on said shaft, a bi-metallic coil attached at its free end to said sleeve, and a relatively fixed support for the other end of said coil.

8. In an instrument of the character described the combination of a casing, indicating devices therein, a base upon which said casing is mounted, an actuating shaft for said indicating devices extending through an opening in said base, a sleeve adjustably mounted on said shaft, a bi-metallic coil connected at its free end to said sleeve, a post mounted in said base, and a second sleeve adjustably mounted on said post, the opposite end of said bi-metallic coil being connected to said second sleeve.

9. In an instrument of the character described the combination of a casing, indicating devices therein, a base upon which said casing is mounted, an actuating shaft for said indicating devices extending through an opening in said base, a sleeve adjustably mounted on said shaft, a bi-metallic coil connected at its free end to said sleeve, a post mounted in said base, a second sleeve adjustably mounted on said post, the opposite end of said bi-metallic coil being connected to said second sleeve, and a telescopic housing attached to said base and enclosing said sleeves and bi-metallic element.

HARRISON H. BOYCE.